(12) United States Patent
Huang et al.

(10) Patent No.: US 11,618,011 B2
(45) Date of Patent: Apr. 4, 2023

(54) V-NI$_2$P/G-C$_3$N$_4$ PHOTOCATALYST AND ITS PREPARATION METHOD AND APPLICATION THEREOF

(71) Applicant: SHAANXI UNIVERSITY OF SCIENCE & TECHNOLOGY, Shaanxi (CN)

(72) Inventors: Jianfeng Huang, Xi'an (CN); Ting Xiao, Xi'an (CN); Liangliang Feng, Xi'an (CN); Liyun Cao, Xi'an (CN); Mengfan Niu, Xi'an (CN); Qianqian Liu, Xi'an (CN); Xiao Zhang, Xi'an (CN)

(73) Assignee: SHAANXI UNIVERSITY OF SCIENCE & TECHNOLOGY, Shaanxi (CN)

( * ) Notice: Subject to any disclaimer, the term of this patent is extended or adjusted under 35 U.S.C. 154(b) by 0 days.

(21) Appl. No.: 17/412,074

(22) Filed: Aug. 25, 2021

(65) Prior Publication Data
US 2022/0062870 A1 Mar. 3, 2022

(30) Foreign Application Priority Data
Sep. 3, 2020 (CN) .......................... 202010917390.4

(51) Int. Cl.
*B01J 27/24* (2006.01)
*B01J 35/08* (2006.01)
(Continued)

(52) U.S. Cl.
CPC ............ *B01J 23/8472* (2013.01); *B01J 27/24* (2013.01); *B01J 35/004* (2013.01); *B01J 35/08* (2013.01);
(Continued)

(58) Field of Classification Search
CPC ...... B01J 23/8472; B01J 27/185; B01J 27/24; B01J 35/004
See application file for complete search history.

(56) References Cited

FOREIGN PATENT DOCUMENTS

| CN | 108940340 A | | 12/2018 |
| CN | 109746018 A | * | 5/2019 |
| CN | 109908969 A | * | 6/2019 |

OTHER PUBLICATIONS

Boppella et al. (Black phosphorus supported Ni2P co-catalyst on graphitic carbon nitride enabling simultaneously boosting charge separation and surface reaction, Applied Catalysis B: Environmental 242 (2019) 422-430), publication date Mar. 2019.*
(Continued)

*Primary Examiner* — Jun Li
(74) *Attorney, Agent, or Firm* — Alleman Hall Creasman & Tuttle LLP (57) ABSTRACT

The invention relates to a V-Ni$_2$P/g-C$_3$N$_4$ photocatalyst, a preparation method, and application thereof. The V-Ni$_2$P/g-C$_3$N$_4$ photocatalyst is a composite material of V-Ni$_2$P and g-C$_3$N$_4$, wherein V-Ni$_2$P has the spherical structure formed by nanosheets; the mass ratio of the V-Ni$_2$P and g-C$_3$N$_4$ is (0.01 to 0.2):1.

8 Claims, 4 Drawing Sheets

(51) Int. Cl.
  *B01J 37/03* (2006.01)
  *B01J 37/04* (2006.01)
  *B01J 37/06* (2006.01)
  *B01J 37/08* (2006.01)
  *B01J 37/10* (2006.01)
  *B01J 23/847* (2006.01)
  *B01J 35/00* (2006.01)
  *B01J 37/00* (2006.01)
  *C01B 3/04* (2006.01)

(52) U.S. Cl.
  CPC ........... *B01J 37/009* (2013.01); *B01J 37/035* (2013.01); *B01J 37/04* (2013.01); *B01J 37/06* (2013.01); *B01J 37/082* (2013.01); *B01J 37/10* (2013.01); *C01B 3/042* (2013.01); *C01B 2203/0277* (2013.01)

(56) References Cited

OTHER PUBLICATIONS

Sun (Phase effect of NixPy hybridized with g-C3N4 for photocatalytic hydrogenation generation, ACS Applied Materials and Interfaces, 2017, 9, 36, 30583-30590), publication date Oct. 9, 2018.*

Li (Vanadium doped nickel phosphide Nanosheets self-assembled microspheres as a high-Efficiency oxygen evolution catalyst, ChemCatChem 2020, 12, 917-925), publication date Nov. 28, 2019.*

Machine translation of Cao et al to CN109908969A, publication date Jun. 21, 2019.*

Machine translation of Cao et al to CN108940340A, publication date Dec. 7, 2018.*

Dong et al. (A General Strategy to Fabricate NixP as Highly Efficient Cocatalyst via Photoreduction Deposition for Hydrogen Evolution, ACS Sustainable Chem. Eng. 2017, 5, 8, 6845-6853).*

* cited by examiner

V-NI$_2$P/G-C$_3$N$_4$ PHOTOCATALYST AND ITS PREPARATION METHOD AND APPLICATION THEREOF

TECHNICAL FIELD

The invention relates to a V-Ni$_2$P/g-C$_3$N$_4$ photocatalyst, and a preparation method and application thereof, in particular to a method for preparing a V-Ni$_2$P/g-C$_3$N$_4$ composite material by adopting a liquid phase and a solid phase method, belonging to the technical field of photocatalysis.

BACKGROUND

As an environmentally friendly and efficient energy source, hydrogen occupies a very important position in the current field of energy research. Hydrogen production by using photolysis of water is more compatible with sustainability goals, and the search for an environmentally friendly and efficient catalyst is always the target of continuous exploration of researchers. As a non-noble metal catalyst, g-C$_3$N$_4$ is more and more widely applied to the field of water photolysis hydrogen production technology, and the search for a co-catalyst with excellent performance still arouses the interest of a large number of scientific researchers.

Heretofore, the method of modifying g-C$_3$N$_4$ with a promoter (transition metal, noble metal, metal chalcogenide, and metal phosphide) to form a heterojunction has been promising. Among them, the heterojunction formed by metal phosphide and g-C$_3$N$_4$ has attracted great interest to researchers because of its excellent performance and environmental protection. As a metal abundant in resources on the earth, nickel has been widely used for production and research, and as a non-noble metal catalyst, Ni$_2$P has been used for research of photocatalytic hydrogen production. Although Patent 1 (Chinese Publication No. CN108940340A) discloses a preparation method of a g-C$_3$N$_4$—Ni$_2$P composite material, the mass ratio of g-C$_3$N$_4$ and Ni$_2$P in the prepared composite material is as high as 10:3, and the impurity sodium element is easily introduced by mixing and calcining Ni(OH)$_2$ and NaH$_2$PO$_2$.

SUMMARY

To this end, the present disclosure provides a new V-Ni$_2$P/g-C$_3$N$_4$ photocatalyst, and a preparation method and application thereof.

In one aspect, the present disclosure provides a V-Ni$_2$P/g-C$_3$N$_4$ photocatalyst. The V-Ni$_2$P/g-C$_3$N$_4$ photocatalyst is a composite material of V-Ni$_2$P and g-C$_3$N$_4$. The V-Ni$_2$P has a spherical structure formed by nanosheets, and the mass ratio of the V-Ni$_2$P and the g-C$_3$N$_4$ is (0.01 to 0.2):1.

In the present disclosure, the V-Ni$_2$P/g-C$_3$N$_4$ photocatalyst is dispersed in g-C$_3$N$_4$ due to V-Ni$_2$P nanospheres, and V-Ni$_2$P is used as a co-catalyst for improving the production performance of g-C$_3$N$_4$ photocatalytic hydrogen. The black V-Ni$_2$P can enhance its absorption capacity for visible light, and when g-C$_3$N$_4$ absorbs sunlight, its valence band electrons are excited to a conduction band. Due to the excellent electron transport capacity of V-Ni$_2$P and the regulation and control of V on an Ni$_2$P electron structure by the transmission and separation of photogenerated electron-hole pairs, the photocatalytic hydrogen production performance is improved.

Preferably, the V in the V-Ni$_2$P is lattice doping, and the doping content is 20 to 66 wt %.

In another aspect, the present disclosure provides a method for preparing the V-Ni$_2$P/g-C$_3$N$_4$ photocatalyst, comprising:

(1) dissolving nickel chloride and vanadium chloride in water, adjusting the pH value to 3 to 5 with an acid solution, to obtain a first mixed solution and filling the first mixed solution into a first chamber of a two-chamber reactor;

(2) dissolving g-C$_3$N$_4$, urea (which is used for regulating the pH of the solution), and ammonium fluoride (which is used for controlling the morphology of V-Ni$_2$P nanospheres) in water, adding ethylene glycol (which is used for promoting the growth of nickel compounds on g-C$_3$N$_4$) to obtain a second mixed solution and loading the second mixed solution into s second chamber of the two-chamber reactor;

(3) putting the two-chamber reactor into a homogeneous reactor, firstly heating at 50° C. to 100° C. for 15 to 30 minutes, then starting rotation to mix the first mixed solution and the second mixed solution, and then heating at 80° C. to 200° C. for 6 to 24 hours, and finally cooling, centrifuging, washing, and drying to obtain a precipitate;

(4) respectively placing sodium hypophosphite and the precipitate on the left side and the right side of a dual-temperature zone tubular atmosphere furnace, heating the left side of the dual-temperature zone tubular atmosphere furnace to 280° C. to 320° C., simultaneously heating the right side to 300° C. to 600° C., and heating for 1 to 3 hours to obtain the V-Ni$_2$P/g-C$_3$N$_4$ photocatalyst.

In the present disclosure, the V-Ni$_2$P/g-C$_3$N$_4$ photocatalytic material is prepared by adopting two methods: the hydrothermal method and the solid phase sintering method.

Preferably, in step (1), the molar ratio of the nickel chloride to the vanadium chloride is (1 to 6):(1 to 3).

Preferably, the acid solution is a hydrochloric acid solution, preferably a hydrochloric acid solution of 0.005 to 0.01 mol/L.

Preferably, in step (2), the mass ratio of the g-C$_3$N$_4$, the urea and the ammonium fluoride is (1 to 20):(1 to 8):(1 to 4), and the ratio of the g-C$_3$N$_4$ to ethylene glycol is (1 to 10) g:(5 to 25) mL.

Preferably, in step (3), the ratio of the nickel chloride to the g-C$_3$N$_4$ is (0.001 to 0.07) mol:(1 to 5) g.

Preferably, in step (4), the mass ratio of the precipitate and the sodium hypophosphite is (1 to 5):(1 to 10), and the temperature of each side is raised at a heating rate of 2 to 10° C./min.

Preferably, the melamine is calcined at 450° C. to 600° C. for 1 to 5 hours to obtain the g-C$_3$N$_4$.

In another aspect, the present disclosure provides an application of the above-mentioned V-Ni$_2$P/g-C$_3$N$_4$ photocatalyst in photocatalytic hydrogen production.

Beneficial Effects

The V-Ni$_2$P/g-C$_3$N$_4$ composite material prepared by the present disclosure adopts a method of separately calcining the phosphorus source and the nickel source to avoid introducing other impurities, the conditions are easy to control, the production cost is low, and the industrial production is easy;

the method for preparing V-Ni$_2$P/g-C$_3$N$_4$ proposed in the present disclosure forms a flower ball formed by stacking V-Ni$_2$P nanosheets, which can be used for enhancing its absorption of visible light, promoting the transmission and separation of photogenerated-electron-hole pairs, and improving the efficiency of hydrogen production;

the V-Ni$_2$P/g-C$_3$N$_4$ composite material prepared by the invention has a photocatalytic function, and can photolyse water to produce hydrogen under light conditions for 30 minutes, and test results show that it has a high-efficiency capacity for water photolytic hydrogen production.

DETAILED DESCRIPTION

The present disclosure will be further described below through the following embodiments. It should be understood that the following embodiments are only used to illustrate the present disclosure, not to limit the present disclosure.

In the present disclosure, the V-$Ni_2$P/g-$C_3N_4$ photocatalyst comprises V-$Ni_2$P and g-$C_3N_4$, wherein V-$Ni_2$P has a spherical structure formed by nanosheets, and the doping form of V is lattice doping. The mass ratio of V-$Ni_2$P and g-$C_3N_4$ can be (0.05 to 0.3):1. Among them, when V-$Ni_2$P is used as an electrocatalyst, the introduction of V can regulate the electronic structure of $Ni_2$P and increase its catalytic active sites of the $Ni_2$P, and defects are made to increase the catalytic active sites of the $Ni_2$P. Moreover, in the V-$Ni_2$P/g-$C_3N_4$ photocatalyst, due to the excellent electron transport ability of V-$Ni_2$P, V-$Ni_2$P can effectively promote the transport and separation of photogenerated-electron-hole pairs of g-$C_3N_4$, but V-$Ni_2$P does not have the performance of photocatalytic hydrogen production, and the active sites for photocatalytic hydrogen production are provided by g-$C_3N_4$.

In one embodiment of the present disclosure, the V-$Ni_2$P/g-$C_3N_4$ photocatalyst is formed by growing V-$Ni_2$P nanoflowers on a g-$C_3N_4$ matrix through a hydrothermal and solid phase sintering method to form a nano-level photocatalytic phase. The preparation process is simple, and the obtained product has high-efficiency photocatalytic hydrogen production energy.

The preparation method of the V-$Ni_2$P/g-$C_3N_4$ photocatalyst is illustrated below.

Preparation of g-$C_3N_4$ matrix.

For example, g-$C_3N_4$ can be obtained from muffle furnace calcination. Firstly, 10 g to 15 g of melamine is put into a porcelain boat, the calcination temperature is 450° C. to 600° C., the heat preservation time is 1 hour to 5 hours, the heating rate is 2 to 10° C./min, so that the blocky g-$C_3N_4$ is obtained. Then taking out the sample and grinding for 30 minutes to 60 minutes, taking 1 g to 5 g of block g-$C_3N_4$, adding 100 to 200 mL of ethanol and carrying out ultrasonic treatment for 5 hours to 10 hours, then carrying out centrifugal washing with deionized water for three times, drying at 60° C. to 80° C. for 6 hours to 12 hours, taking out and grinding for later use.

The nickel chloride and vanadium chloride are dissolved in water, and the pH value is adjusted to 3 to 5 with an acid solution to obtain a mixed solution A. Among them, nickel chloride (nickel chloride hexahydrate) and vanadium chloride are mixed according to the following molar ratio: nickel chloride hexahydrate:vanadium chloride=(1 to 6):(1 to 3). Nickel chloride and vanadium chloride can also be prepared into solutions with different concentrations and then used as a source of nickel and vanadium, for example, 0.1 mol/L to 0.5 mol/L nickel chloride hexahydrate solution and 0.01 mol/L to 0.2 mol/L vanadium chloride solution. The acid solution used can be 0.005 mol/L to 0.01 mol/L hydrochloric acid solution. As an example, 5 to 20 mL of 0.1 mol/L to 0.5 mol/L hexahydrate nickel chloride solution and 5 to 20 mL of 0.01 mol/L to 0.2 mol/L vanadium chloride solution are added into a 50 mL beaker, and then 0.005 mol/L to 0.01 mol/L of hydrochloric acid solution is added to adjust the pH value to 3 to 5, and the mixture is magnetically stirred for 30 minutes to 80 minutes to obtain a mixed solution A.

G-$C_3N_4$, urea, and ammonium fluoride are dissolved in water, and ethylene glycol is added to obtain a mixed solution B. Among them, the mass ratio of g-$C_3N_4$:urea: ammonium fluoride=(1 to 20):(1 to 8):(1 to 4), the mass ratio of g-$C_3N_4$:ethylene glycol=(1 to 10) g:(5 to 25) mL. As an example, 10 mL to 80 mL of deionized water and 5 mL to 15 mL of ethylene glycol are added into a 100 mL beaker, and then ingredients of g-$C_3N_4$, urea, ammonium fluoride are added, and the mass of g-$C_3N_4$, urea, and ammonium fluoride can be (1 to 5) g, (0.5 to 2) g, (0.1 to 0.6) g respectively, and the mixture is magnetically stirred for 30 minutes to 80 minutes to obtain a mixed liquid B.

The solution A is poured into one side of a two-chamber hydrothermal kettle. Finally, the mixed solution B is poured into the other side of the two-chamber hydrothermal kettle. Among them, the ratio of nickel chloride in the mixed solution A to g-$C_3N_4$ in the mixed solution B can be (0.001 to 0.07) mol:(1 to 5) g.

The two-chamber hydrothermal kettle is loaded into a homogeneous reactor, and the temperature is raised to 50° C. to 100° C. after the reactor is started, and the continuous heating time is 15 minutes to 30 minutes. At this time, the mixed solution A and the mixed solution B are still not mixed. The purpose of the pre-reaction at 50° C. to 100° C. is to fully dissolve the nickel chloride and vanadium chloride to form an ionic form.

Heating the hydrothermal temperature of the two-chamber hydrothermal kettle to 80° C. to 200° C., starting to rotate to mix the mixed solution A and the mixed solution B, and maintaining the temperature for 6 hours to 24 hours to obtain a precipitate C, taking out the reaction kettle for cooling after lowering the temperature. The cooled reaction solution is taken out and centrifuged, and washed with deionized water and ethanol for three times respectively to obtain the precipitate C, which is then placed in a vacuum drying oven to dry for 10 hours to 24 hours. In the hydrothermal process, a precursor of V-$Ni_2$P grows on a g-$C_3N_4$ matrix or is wrapped by g-$C_3N_4$, the precursor is tightly combined with g-$C_3N_4$, and a V-$Ni_2$P/g-$C_3N_4$ compound is formed through phosphorization, and the V-$Ni_2$P tightly combined with g-$C_3N_4$ is favorable for transmission and separation of photo-generated electron-hole pairs, so that the photocatalytic performance is promoted.

The precipitate C is ground to obtain a powder D, and the grinding time is controlled to be 30 minutes to 80 minutes. The powder D and sodium hypophosphite are mixed in the following mass ratio: powder:sodium hypophosphite=(1 to 5):(1 to 10). The porcelain boat filled with sodium hypophosphite is placed on the left side of the dual temperature zone tubular atmosphere furnace. The porcelain boat filled with the powder D is placed on the right side of the dual temperature zone tubular atmosphere furnace. Finally, the dual temperature zone tube furnace is evacuated to vacuum, and argon gas is introduced, and the operation is repeated for three times until all the oxygen in the tube furnace is discharged.

Heating the left tube furnace to 280° C. to 320° C. at a heating rate of 2 to 10° C./min. At the same time, the temperature of the right tube furnace is raised to 300° C. to 600° C. at a heating rate of 2 to 10° C./min. Among them, the separated calcination avoids sodium impurities introduced after calcination with sodium hypophosphite, and at the same time can ensure that a sufficient phosphorus source exists in the tubular furnace. Finally, preserving the heat for 1 hour to 3 hours to obtain the V-$Ni_2P$/g-$C_3N_4$ photocatalyst. Cooling the product, taking out and grinding for 30 minutes to 60 minutes.

Using LabSolar 6A model equipment to test the photocatalytic effect of V-$Ni_2P$/g-$C_3N_4$. The specific test process comprises the steps of weighing 10 mg to 50 mg photocatalyst and 5 mL to 20 mL triethanolamine, putting into a glass reaction vessel containing 50 mL to 100 mL deionized water, and irradiating for 2 hours to 6 hours.

Hereinafter, the present disclosure will be further described with the following examples. It should be understood that the following examples are used to explain this invention and do not mean to limit the scope of this invention. Any non-essential improvements and modifications made by a person skilled in the art based on this invention all fall into the protection scope of this invention. The specific process parameters below are only exemplary, and a person skilled in the art can choose proper values within an appropriate range according to the description, and are not restricted to the specific values shown below.

Example 1

(1) First, putting 15 g of melamine into a porcelain boat, calcining at 550° C., maintaining the temperature for 4 hours, and raising the temperature at 2° C./min to obtain blocky g-$C_3N_4$, taking out the sample and grinding for 60 minutes. Taking 1 g of block g-$C_3N_4$, adding 100 mL of ethanol, performing ultrasonic treatment for 6 hours, then performing centrifugal washing for three times by using deionized water, drying at 60° C. for 10 hours, taking out and grinding for later use;

(2) in a 50 mL beaker was added 10 mL of 0.2 mol/L nickel chloride hexahydrate solution and 10 mL of 0.04 mol/L vanadium chloride solution. The nickel chloride hexahydrate and vanadium chloride were mixed according to the following molar ratio: hexahydrate nickel chloride:vanadium chloride=5:1. Then 0.005 mol/L hydrochloric acid solution was added to adjust the pH value to 4, and the mixture was magnetically stirred for 15 minutes to obtain a mixed solution A. Then pouring the mixed solution A into one side of the two-chamber hydrothermal kettle;

(3) adding 20 mL of deionized water and 10 mL of ethylene glycol into a 100 mL beaker, and then adding ingredients of g-$C_3N_4$, urea, ammonium fluoride, etc., according to the following mass ratio: g-$C_3N_4$:urea:ammonium fluoride=2.5 g:0.8 g:0.2 g, and magnetically stirred for 30 minutes to obtain a mixed solution B. Finally, pouring the mixed solution B into the other side of the two-chamber hydrothermal kettle;

(4) loading the two-chamber hydrothermal kettle into a homogeneous reactor, starting the reactor, raising the temperature to 50° C., and maintaining the temperature for 15 minutes. Then raising the temperature to 120° C., starting to rotate, and maintaining the temperature for 12 hours. Taking out the reaction kettle for cooling after lowering the temperature;

(5) taking out the cooled solution, centrifugal, washing with deionized water and ethanol for three times respectively, and drying in a vacuum drying oven for 12 hours to obtain a precipitate C;

(6) the dried precipitate C was taken out and ground for 30 minutes to obtain a powder D. The powder D and sodium hypophosphite were blended in the following mass ratio: Powder D:Sodium hypophosphite=1:5. Putting the porcelain boat containing sodium hypophosphite on the left side of the dual temperature zone tubular atmosphere furnace, and placing the porcelain boat containing sample powder on the right side, and then pumping the tube furnace to be vacuum, introducing argon gas, and repeating the operation for three times, until all the oxygen in the tube furnace was discharged;

(7) heating the left tube furnace to 300° C. at a heating rate of 10° C./min, and at the same time heating the right tube furnace to 500° C. at a heating rate of 10° C./min, and continuous heating for 2 hours;

(8) cooling the product, taking out, and grinding for 30 minutes to obtain the V-$Ni_2P$/g-$C_3N_4$ photocatalyst. The mass ratio of V-$Ni_2P$ and g-$C_3N_4$ in the obtained photocatalyst was 0.08:1. V in V-$Ni_2P$ was lattice doped with a doping content of 20 wt %.

Figure 1:
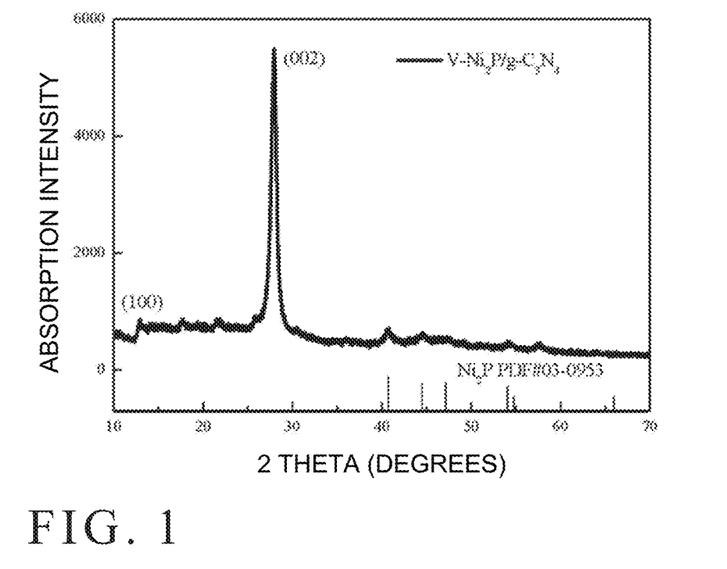
FIG. 1 shows an X-ray diffraction analysis chart of the V-$Ni_2$P/g-$C_3N_4$ photocatalyst prepared in Example 1, wherein the abscissa is the 2θ angle and the ordinate is the absorption intensity.

FIG. 1 is an X-ray diffraction analysis chart of V-$Ni_2P$/g-$C_3N_4$ prepared in Example 1, wherein the abscissa is the 2θ angle, and the ordinate is the absorption intensity. The (100) crystal plane and (002) crystal plane of g-$C_3N_4$ are respectively corresponding to the positions of 13° and 27°, and V-$Ni_2P$/g-$C_3N_4$ can accurately correspond to $Ni_2P$ PDF #03-0953, which indicates that V-$Ni_2P$/g-$C_3N_4$ photocatalyst is successfully prepared.

Figure 2:
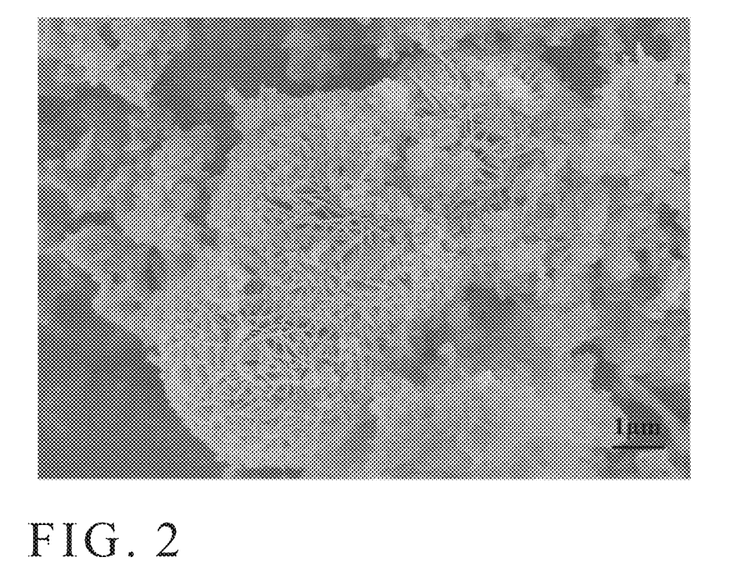
FIG. 2 shows a scanning diagram of the V-$Ni_2$P/g-$C_3N_4$ photocatalyst prepared in Example 1 under 1 μm.

FIG. 2 is a scan diagram of V-$Ni_2P$/g-$C_3N_4$ prepared in Example 1 at 1 μm. Among them, it can be clearly seen that the flower ball composed of V-$Ni_2P$ nanosheets, and the irregular block structure is the amorphous state of g-$C_3N_4$.

Figure 3:
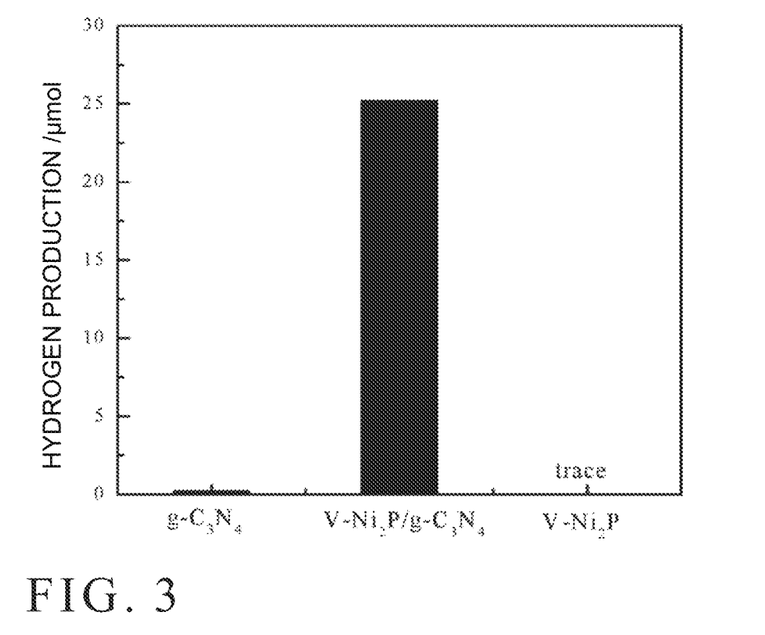
FIG. 3 shows a hydrogen production performance diagram of the V-$Ni_2$P/g-$C_3N_4$ photocatalyst prepared in Example 1, wherein the abscissa is the number of samples and the ordinate is the hydrogen production.

FIG. 3 is a graph of the hydrogen production performance of V-$Ni_2P$/g-$C_3N_4$ prepared in Example 1, wherein the abscissa is the number of samples and the ordinate is the hydrogen production. Among them, the hydrogen production performance of pure phase g-$C_3N_4$ is 0.21 μmol, while the pure phase V-$Ni_2P$ does not detect the trace of hydrogen, but the successfully compounded V-$Ni_2P$/g-$C_3N_4$ hydrogen production performance is 25.18 μmol. The hydrogen performance has been significantly improved.

Example 2

(1) Firstly, putting 10 g of melamine into a porcelain boat, the calcination temperature was 550° C., the heat preservation time was 3 hours, the heating rate was 5° C./min, to obtain blocky g-$C_3N_4$, taking out the sample and grinding for 60 minutes. Taking 2 g of block g-$C_3N_4$, adding 200 mL of ethanol and carrying out ultrasonic treatment for 10 hours, then carrying out centrifugal washing for three times by using deionized water, drying at 80° C. for 12 hours, taking out and grinding for later use;

(2) 5 mL of 0.4 mol/L nickel chloride hexahydrate solution and 15 mL of 0.034 mol/L vanadium chloride solution were added into a 50 mL beaker, the nickel chloride hexahydrate and vanadium chloride were mixed according to the following molar ratio: hexahydrate nickel chloride:vanadium chloride=4:1. Then 0.008 mol/L hydrochloric acid solution was added to adjust the pH value to 5, and the mixture was magnetically stirred for 20 minutes to obtain a mixed solution A. Then pouring the mixed solution A into one side of the two-chamber hydrothermal kettle;

(3) adding 30 mL of deionized water and 20 mL of ethylene glycol into a 100 mL beaker, and then adding ingredients of g-$C_3N_4$, urea, ammonium fluoride for batching, according to the following mass ratio: g-$C_3N_4$:urea:ammonium fluoride=2 g:0.5 g:0.1 g, and magnetically stirred for 30 minutes to obtain a mixed solution B. Finally, pouring the mixed solution B into the other side of the two-chamber hydrothermal kettle;

(4) putting the two-chamber hydrothermal kettle into a homogeneous reactor, starting the reactor, raising the temperature to 60° C., maintaining the temperature for 20 minutes. Then raising the temperature to 140° C., starting rotation, maintaining the temperature for 6 hours. Taking out the reaction kettle for cooling after lowering the temperature;

(5) taking out the cooled solution, carrying out centrifugal washing with deionized water and ethanol for three times respectively, and drying in a vacuum drying oven to dry for 12 hours to obtain a precipitate C;

(6) taking out the dried precipitate C and grinding for 30 minutes to obtain a powder D. The powder D and sodium hypophosphite were blended in the following mass ratio: Powder D:Sodium hypophosphite=1:6. Placing the porcelain boat containing sodium hypophosphite on the left side of the dual temperature zone tubular atmosphere furnace, and placing the porcelain boat containing sample powder on the right side, and then pumping the tube furnace to be vacuum, introducing argon gas, and repeating the operation for three times, until all the oxygen in the tube furnace was discharged;

(7) heating the left tube furnace to 300° C. at a heating rate of 5° C./min, and at the same time heating the right tube furnace to 450° C. at a heating rate of 5° C./min, and continuous heating for 2 hours;

(8) cooling the product, taking out, and grinding for 30 minutes to obtain the V-$Ni_2$P/g-$C_3N_4$ photocatalyst. The mass ratio of V-$Ni_2$P and g-$C_3N_4$ in the obtained photocatalyst was 0.1:1. V in V-$Ni_2$P was lattice doping with the doping content of 25 wt %.

Example 3

(1) First, putting 13 g of melamine into a porcelain boat, calcining at 600° C., maintaining the temperature for 2 hours, raising the temperature at 5° C./min to obtain blocky g-$C_3N_4$, taking out the sample and grinding for 60 minutes, taking 2 g of block g-$C_3N_4$, adding 200 mL ethanol, carrying out ultrasound for 10 hours, then carrying out centrifugal washing for three times by using deionized water, drying at 80° C. for 12 hours, taking out and grinding for later use;

(2) 15 mL of 0.134 mol/L nickel chloride hexahydrate solution and 5 mL of 0.134 mol/L vanadium chloride solution were added into a 50 mL beaker. The nickel chloride hexahydrate and vanadium chloride were mixed according to the following molar ratio: hexahydrate nickel chloride:vanadium chloride=3:1. Then 0.008 mol/L hydrochloric acid solution was added to adjust the pH value to 4.5, and the mixture was magnetically stirred for 25 minutes to obtain a mixed solution A. Then pouring the mixed solution A into one side of the two-chamber hydrothermal kettle;

(3) adding 15 mL of deionized water and 15 mL of ethylene glycol into a 100 mL beaker, and then adding ingredients of g-$C_3N_4$, urea, ammonium fluoride, etc., according to the following mass ratio: g-$C_3N_4$:urea:ammonium fluoride=1.6 g:0.6 g:0.15 g, magnetically stirred for 30 minutes to obtain a mixed solution B. Finally, pouring the mixed solution B into the other side of the two-chamber hydrothermal kettle, and finally introducing nitrogen into the hydrothermal kettle to discharge air;

(4) putting the two-chamber hydrothermal kettle into a homogeneous reactor, starting the reactor, raising the temperature to 60° C., maintaining the temperature for 15 minutes. Then raising the temperature to 120° C., starting rotation, maintaining the temperature for 8 hours, and taking out the reaction kettle for cooling after lowering the temperature;

(5) taking out the cooled solution, carrying out centrifugal, washing with deionized water and ethanol for three times respectively, and drying in a vacuum drying oven to dry for 14 hours to obtain a precipitate C;

(6) taking out the dried precipitate C and grinding for 30 minutes to obtain a powder D. And mixing the powder D and sodium hypophosphite in the following mass ratio: Powder D:Sodium hypophosphite=1:8. Placing the porcelain boat containing sodium hypophosphite on the left side of the dual temperature zone tubular atmosphere furnace, placing the porcelain boat containing sample powder on the right side, and then pumping the tube furnace to be vacuum, introducing argon gas, and repeating the operation for three times, until all the oxygen in the tube furnace was discharged;

(7) heating the left tube furnace to 290° C. at a heating rate of 10° C./min, and at the same time heating the right tube furnace to 400° C. at a heating rate of 10° C./min, and preserving heat for 2 hours;

(8) cooling the product, taking out and grinding for 30 minutes to obtain the V-$Ni_2$P/g-$C_3N_4$ photocatalyst. The mass ratio of V-$Ni_2$P and g-$C_3N_4$ in the obtained photocatalyst was 0.15:1. V in V-$Ni_2$P was lattice doping with the doping content of 33 wt %.

Comparative Example 1

Figure 4:
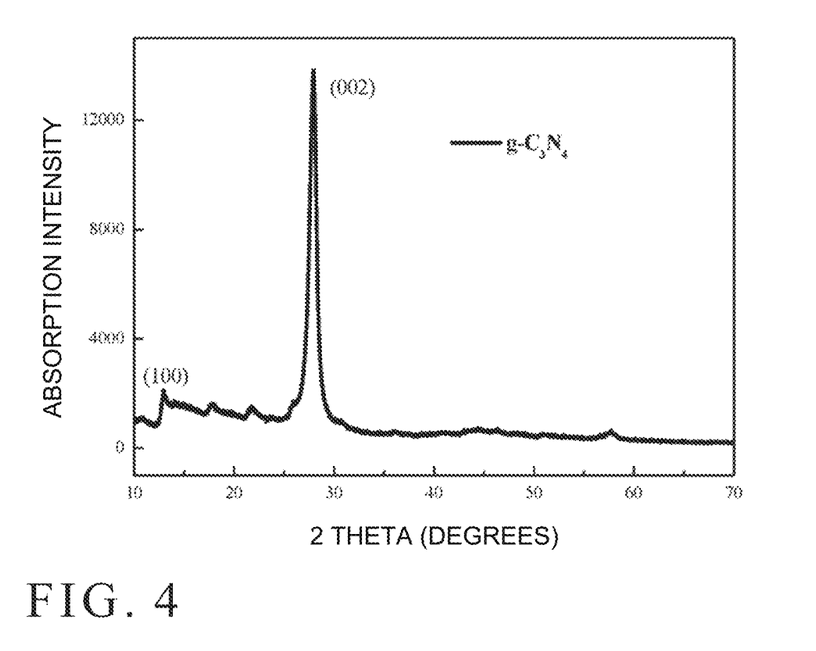
FIG. 4 shows an X-ray diffraction analysis chart of pure phase g-$C_3N_4$, wherein the abscissa is the 2θ angle, and the ordinate is the absorption intensity.

Putting 13 g of melamine into a porcelain boat, calcining at 600° C., maintaining the temperature for 2 hours, and raising the temperature at 5° C./min to obtain blocky g-$C_3N_4$. The sample was taken out and ground for 60 minutes. Taking 2 g of block g-$C_3N_4$, adding 200 mL ethanol, carrying out ultrasonic treatment for 10 hours, then carrying out centrifugal washing for three times by using deionized water, drying at 80° C. for 12 hours, taking out and grinding for later use. FIG. 4 is an X-ray diffraction analysis chart of pure phase g-$C_3N_4$, wherein the abscissa is the 2θ angle and the ordinate is the absorption intensity. The (100) crystal plane and (002) crystal plane of g-$C_3N_4$ are respectively corresponding to the positions of 13° and 27°, which indicates that g-$C_3N_4$ is successfully prepared.

Comparative Example 2

Figure 5:
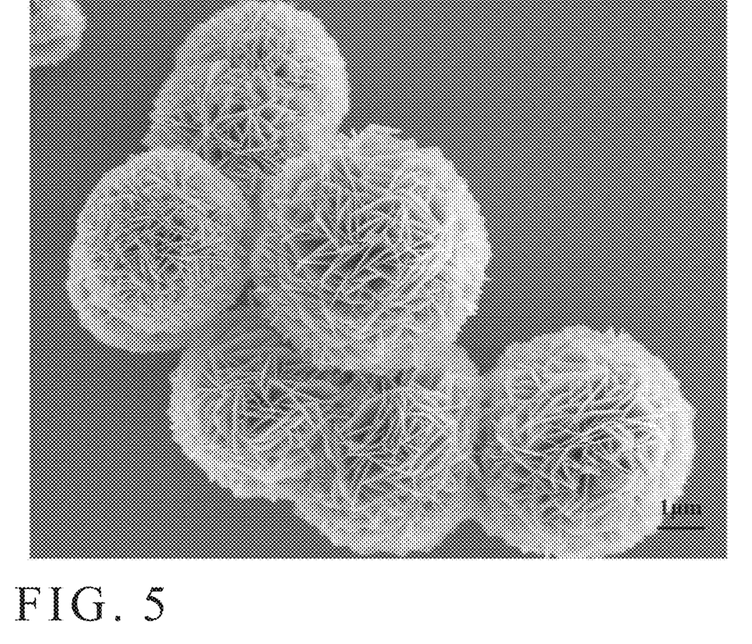
FIG. 5 shows a scanning image of V-$Ni_2$P prepared in Comparative Example 2 at 1 μm.

(1) adding 25 mL of 0.08 mol/L nickel chloride hexahydrate solution and 5 mL of 0.08 mol/L vanadium chloride solution into a 50 mL beaker, mixing the nickel chloride hexahydrate and vanadium chloride according to the following molar ratio: hexahydrate nickel chloride:vanadium chloride=5:1. Then adding 1 mL of dimethylformamide, and finally adding 0.005 mol/L hydrochloric acid solution to adjust the pH to 4, and the mixture was magnetically stirred for 15 minutes to obtain a mixed solution A. Then pouring the mixed solution A into one side of the two-chamber hydrothermal kettle;

(2) adding 30 mL of deionized water into a 50 mL beaker, and then adding ingredients of urea, and ammonium fluoride, according to the following mass ratio: urea:ammonium fluoride=1.25 g:0.36 g, and the mixture was magnetically stirred for 30 minutes to obtain a mixed solution B. Finally, pouring the mixed solution B into the other side of the two-chamber hydrothermal kettle;

(3) putting the two-chamber hydrothermal kettle into a homogeneous reactor, and starting the reactor, raising the temperature to 50° C., maintaining the temperature for 15 minutes. Then raising the temperature to 120° C., starting rotation, maintaining the temperature for 12 hours, and taking out the reaction kettle for cooling after lowering the temperature;

(4) taking out the cooled solution, centrifuging, and washing with deionized water and ethanol for three times respectively, and drying in a vacuum drying oven to dry for 12 hours to obtain a precipitate C;

(5) taking out the dried precipitate C and grinding for 30 minutes to obtain a powder D. And mixing the powder D and sodium hypophosphite in the following mass ratio: Powder D:Sodium hypophosphite=1:5. Placing the porcelain boat containing sodium hypophosphite on the left side of the dual temperature zone tubular atmosphere furnace, placing the porcelain boat containing sample powder on the right side, and then pumping the tube furnace to be vacuum, introducing argon gas, and repeating the operation for three times, until all the oxygen in the tube furnace was discharged;

(6) heating the left tube furnace to 300° C. at a heating rate of 10° C./min, and at the same time heating the right tube furnace to 500° C. at a heating rate of 10° C./min, and continuous heating for 2 hours;

(7) cooling the product, taking out and grinding for 30 minutes to obtain the V-Ni$_2$P/g-C$_3$N$_4$ photocatalyst. FIG. 5 is a scanning image of V-Ni$_2$P prepared in Comparative Example 2 at 1 μm. Among them, the flower ball composed of V-Ni$_2$P nanosheets can be clearly seen.

Comparative Example 3

(1) First, putting 15 g of melamine into a porcelain boat, calcining at 550° C., maintaining the temperature for 4 hours, raising the temperature at 2° C./min, to obtain blocky g-C$_3$N$_4$, taking out the sample and grinding for 60 minutes, taking 1 g of block g-C$_3$N$_4$, adding 100 mL ethanol, carrying out ultrasound for 6 hours, then carrying out centrifugal washing for three times by using deionized water, drying at 60° C. for 10 hours, taking out and grinding for later use;

(2) adding 0.29 g of nickel nitrate hexahydrate and 0.1 g of urea into a hydrothermal kettle containing 40 mL of deionized water and 20 mL of ethylene glycol, then adding 1.6 g of g-C$_3$N$_4$ powder and stirring for 30 minutes to form a uniform solution;

(3) putting the hydrothermal kettle into the oven, starting the oven and raising the temperature to 120° C., maintaining the temperature for 10 hours, and taking out the reaction kettle for cooling after lowering the temperature;

(4) taking out the cooled solution and carrying out centrifugal washing for three times by using deionized water and ethanol, and then putting in a vacuum drying oven to dry for 12 hours to obtain a precipitate E;

(5) taking out the dried precipitate E and grinding to obtain a powder F, putting the powder F and sodium hypophosphite into a porcelain boat and mixing according to the following mass ratio: Powder F:Sodium hypophosphite=1:5. The sodium hypophosphite was placed upstream of the porcelain boat, the powder F was placed downstream of the porcelain boat, and the porcelain boat was placed in the tube furnace, and then pumping the tube furnace to be vacuum, and introducing argon gas, repeating the operation for three times, until all the oxygen in the tube furnace was discharged;

(6) raising the tube furnace to 500° C. at a heating rate of 10° C./min, and continuous heating for 2 hours;

(7) cooling the product, taking out, and grinding for 30 minutes to obtain the V-Ni$_2$P/g-C$_3$N$_4$ photocatalyst.

Figure 6:
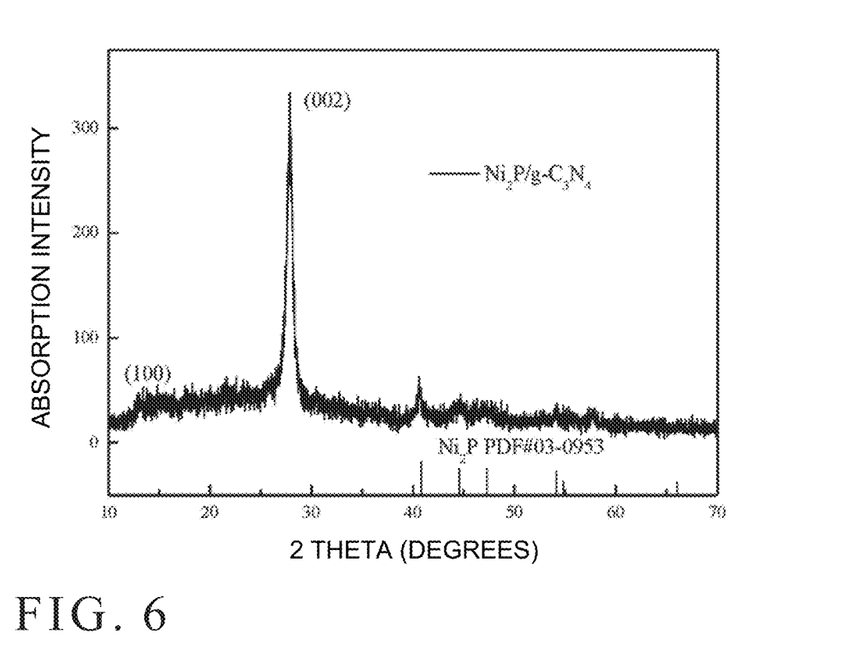
FIG. 6 shows an X-ray diffraction analysis chart of $Ni_2$P/g-$C_3N_4$ prepared in Comparative Example 3, wherein the abscissa is the 2θ angle, and the ordinate is the absorption intensity.

FIG. 6 is an X-ray diffraction analysis chart of Ni$_2$P/g-C$_3$N$_4$ prepared in Comparative Example 3, where the abscissa is the 2θ angle, and the ordinate is the absorption intensity. The positions of 13° and 27° correspond to the (100) crystal plane and (002) crystal plane of g-C$_3$N$_4$ respectively. Ni$_2$P in Ni$_2$P/g-C$_3$N$_4$ corresponds to PDF #03-0953, indicating the successful preparation of Ni$_2$P/g-C$_3$N$_4$ photocatalyst.

Figure 7:
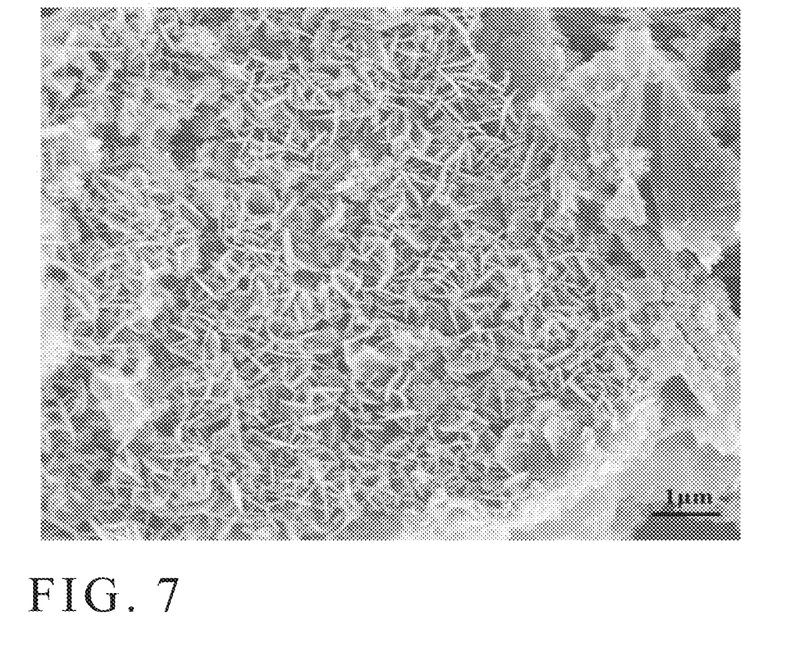
FIG. 7 shows a scanning image of $Ni_2$P/g-$C_3N_4$ prepared in Comparative Example 3 at 1 μm.

FIG. 7 is a scan diagram of Ni$_2$P/g-C$_3$N$_4$ prepared in Comparative Example 3 at 1 μm. Among them, it can be clearly seen that Ni$_2$P nanosheets grow on bulk g-C$_3$N$_4$.

Figure 8:
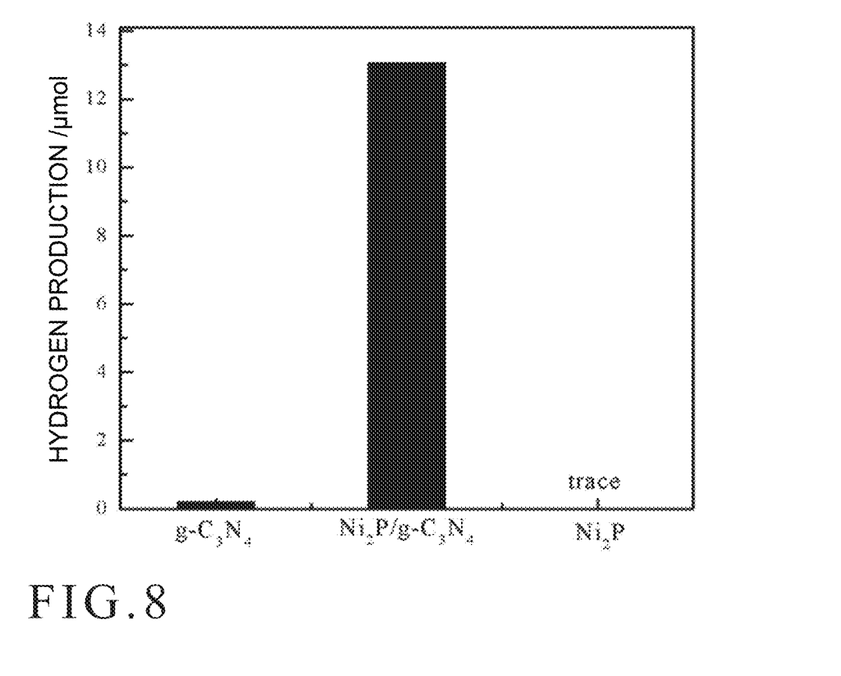
FIG. 8 shows a graph of the hydrogen production performance of $Ni_2$P/g-$C_3N_4$ prepared in Comparative Example 3, wherein the abscissa is the number of samples and the ordinate is the hydrogen production.

FIG. 8 is a graph of the hydrogen production performance of Ni$_2$P/g-C$_3$N$_4$ prepared in Comparative Example 3, where the abscissa is the number of samples and the ordinate is the hydrogen production. Among them, the hydrogen production performance of pure phase g-C$_3$N$_4$ is 0.21 μmol, while the pure phase Ni$_2$P does not detect hydrogen production, and the hydrogen production performance of composite Ni$_2$P/g-C$_3$N$_4$ is 13.06 μmol.

The invention claimed is:

1. A method for preparing a V-Ni$_2$P/g-C$_3$N$_4$ photocatalyst comprising a composite material of V-Ni$_2$P and g-C$_3$N$_4$, wherein the V-Ni$_2$P is Ni$_2$P doped with V and the mass ratio of the V-Ni$_2$P and the g-C$_3$N$_4$ is (0.01 to 0.2):1, the method comprising:

(1) dissolving nickel chloride and vanadium chloride in water, adjusting the pH value to 3 to 5 with an acid solution, to obtain a first mixed solution, and filling the first mixed solution into a first chamber of a two-chamber reactor;

(2) dissolving g-C$_3$N$_4$, urea, and ammonium fluoride in water, adding ethylene glycol to obtain a second mixed solution and loading the second mixed solution into a second chamber of the two-chamber reactor;

(3) putting the two-chamber reactor into a homogeneous reactor, firstly heating at 50° C. to 100° C. for 15 to 30 minutes, then starting rotation to mix the first mixed solution and the second mixed solution, and then heating at 80° C. to 200° C. for 6 to 24 hours, and finally cooling, centrifuging, washing, and drying to obtain a precipitate;

(4) respectively placing sodium hypophosphite and the precipitate on the left side and the right side of a dual-temperature zone tubular atmosphere furnace, heating the left side of the dual-temperature zone tubular atmosphere furnace to 280° C. to 320° C., simultaneously heating the right side to 300° C. to 600° C., and heating for 1 to 3 hours to obtain the V-Ni$_2$P/g-C$_3$N$_4$ photocatalyst.

2. The preparation method of claim 1, wherein in step (1), the molar ratio of the nickel chloride to the vanadium chloride is (1 to 6):(1 to 3).

3. The preparation method of claim 1, wherein the acid solution is a hydrochloric acid solution.

4. The preparation method of claim 3, wherein the hydrochloric acid solution is 0.005 to 0.01 mol/L.

5. The preparation method of claim 1, wherein in step (2), the mass ratio of the g-C$_3$N$_4$, the urea, and the ammonium fluoride is (1 to 20):(1 to 8):(1 to 4).

6. The preparation method of claim 1, wherein in step (3), the ratio of the nickel chloride to the g-C$_3$N$_4$ is (0.001 to 0.07) mol:(1 to 5) g.

7. The preparation method of claim 1, wherein in step (4), the mass ratio of the precipitate and the sodium hypophosphite is (1 to 5):(1 to 10), and the temperature of each side is raised at a heating rate of 2 to 10° C./min.

8. The preparation method of claim 1, further comprising calcining wherein the melamine is calcined at 450° C. to 600° C. for 1 to 5 hours to obtain the g-C$_3$N$_4$.

* * * * *

UNITED STATES PATENT AND TRADEMARK OFFICE
CERTIFICATE OF CORRECTION

| | | |
|---|---|---|
| PATENT NO. | : 11,618,011 B2 | Page 1 of 1 |
| APPLICATION NO. | : 17/412074 | |
| DATED | : April 4, 2023 | |
| INVENTOR(S) | : Jianfeng Huang et al. | |

It is certified that error appears in the above-identified patent and that said Letters Patent is hereby corrected as shown below:

In the Claims

Column 11, in Claim 8, Line 22:
"calcining wherein the melamine is calcined at 450° C."
Should read:
--calcining melamine at 450° C.--

Signed and Sealed this
First Day of April, 2025

Coke Morgan Stewart
*Acting Director of the United States Patent and Trademark Office*